J. STEVENSON.
Fruit-Driers.
No. 137,634. Patented April 8, 1873.
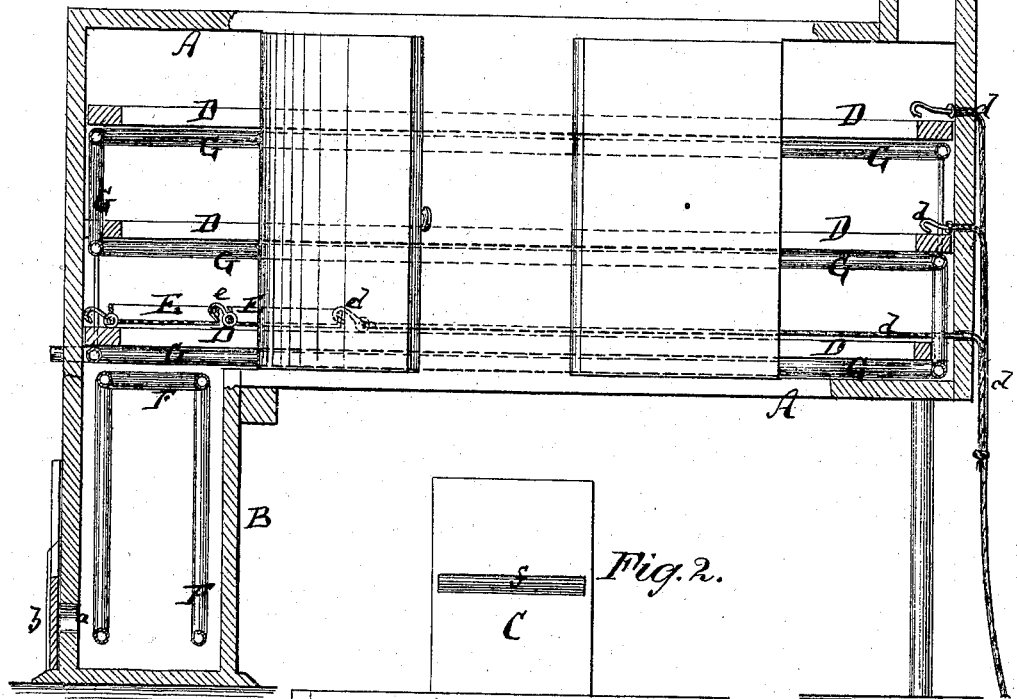
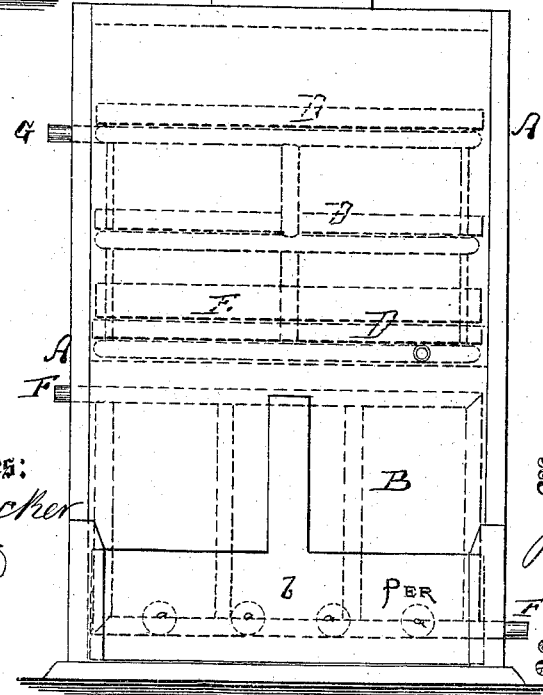
Witnesses:
John Becker
C. Sedgwick
Inventor:
J. Stevenson
per
F. Munn
Attorneys.

UNITED STATES PATENT OFFICE.

JOHN STEVENSON, OF SPARTA, ILLINOIS.

IMPROVEMENT IN FRUIT-DRIERS.

Specification forming part of Letters Patent No. 137,634, dated April 8, 1873; application filed October 19, 1872.

*To all whom it may concern:*

Be it known that I, JOHN STEVENSON, of Sparta, in the county of Randolph and State of Illinois, have invented a new and Improved Fruit-Drier, of which the following is a specification:

Figure 1 is a side elevation, partly in section, of my improved fruit-drier. Fig. 2 is an end elevation of the same.

Similar letters of reference indicate corresponding parts.

This invention consists in a fruit-drier having two separate but communicating chambers, which are provided one with a series of superposed open-frame supports for trays, and with steam-pipes arranged beneath the open frames, and the other with a steam-coil, which serves to heat the air preparatory to its passage into the drying-chamber, all as will be hereinafter described.

A in the drawing represents the outer case or structure of the drying-chamber made of suitable material. B is an air-heating chamber arranged under one end of the chamber A, and in communication therewith. C is the chimney, through which the heated moist air will escape. This chimney projects from that part of the chamber A which is diagonally opposite to the chamber B. D D are open frames or supports for the shelves E E or trays. These frames are arranged at varying heights in A to allow the placing of the trays or shelves in several tiers. A steam-pipe, F, in several coils or branches, is arranged within the chamber B and connected with a steam-boiler. It serves to heat the air in B. Such air is admitted into the chamber B through an opening, *a*, near the bottom of the same, which opening can be enlarged or reduced by means of a slide or gate, *b*. Another steam-pipe, G, is placed within the chamber A in layers, extending back and forth under the several frames D, as shown. The chamber A has doors at or near both ends for the insertion and withdrawal of trays.

The fruit is placed in the trays, which are inserted through the door next above the chamber B. After a certain length of time the trays are drawn more or less toward the other end of the chamber A by means of strings *d d* which pass through such end of A and hook over the trays, as shown in Fig. 1. The several trays on each frame D are, moreover, connected with each other by hooks *e e*, so that they are all moved simultaneously by means of the strings *d*. After the fruit has been properly dried the trays containing it are removed through the door which is furthest from the chamber B.

The air is first heated in the chamber B, and ascends thence into A, where it is still more heated and absorbs the moisture from the heated fruit passing off through the chimney C, its escape being regulated by a damper, *f*.

Having thus described my invention, I claim as new and desire to secure by Letters Patent—

The fruit-drier herein described, consisting of the air-heating chamber A, drying-chamber B, chimney C, steam-pipes F G, superposed open frames D, trays E, and traversing cords and hooks *d*, all constructed and arranged to operate as set forth.

JOHN STEVENSON.

Witnesses:
 JOHN WATSON,
 THEO. SIMPSON.